Aug. 19, 1958 W. C. JURGENS ET AL 2,848,293

MECHANICAL INTERLOCK FOR CABINET-HOUSED APPARATUS-MOUNTING FRAMEWORKS

Filed July 2, 1956 3 Sheets-Sheet 1

INVENTORS W. C. JURGENS
J. A. SEIFERT
BY
A. F. Kane
ATTORNEY

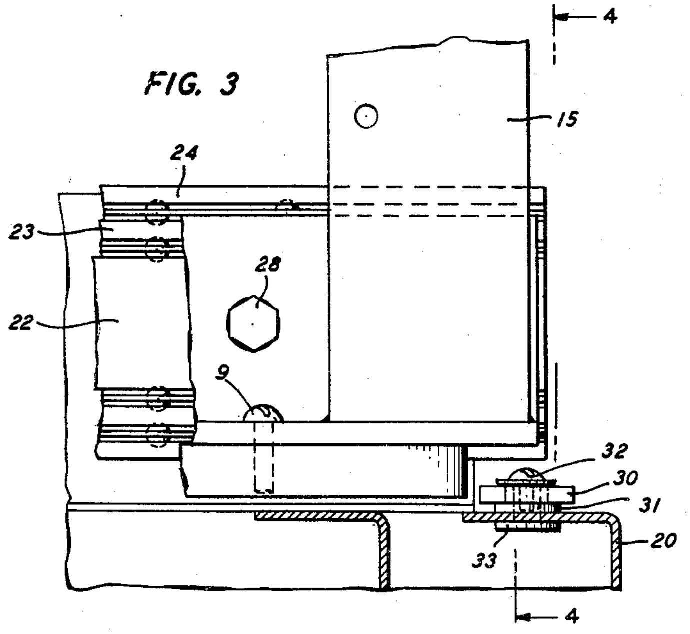
FIG. 4
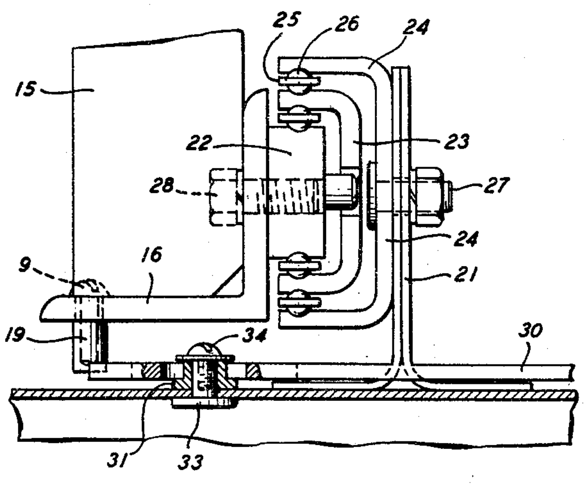
INVENTORS W. C. JURGENS
J. A. SEIFERT
BY
A. F. Kane
ATTORNEY Aug. 19, 1958 W. C. JURGENS ET AL 2,848,293

MECHANICAL INTERLOCK FOR CABINET-HOUSED APPARATUS-MOUNTING FRAMEWORKS

Filed July 2, 1956 3 Sheets-Sheet 3

INVENTORS W. C. JURGENS
J. A. SEIFERT
BY
A. F. Kane
ATTORNEY

United States Patent Office 2,848,293

Patented Aug. 19, 1958

2,848,293

MECHANICAL INTERLOCK FOR CABINET-HOUSED APPARATUS-MOUNTING FRAMEWORKS

William C. Jurgens, Copiague, and Joseph A. Seifert, New Hyde Park, N. Y., assignors to Bell Telephone Laboratories, Incorporated, New York, N. Y., a corporation of New York Application July 2, 1956, Serial No. 595,348

5 Claims. (Cl. 312—222)

This invention relates to multi-unit apparatus-housing cabinets and particularly to means for eliminating the possibility of hazardous weight unbalances resulting from the withdrawal, from home positions in a cabinet, of more than one unit at a time.

Apparatus for use in the communications art, especially in the fields of wire telegraphy and telephony, and a large variety of analogous apparatus assemblies in the electrical arts generally, are housed for purposes of security, mobility and ease of maintenance, in appropriately designed cabinets. This method of housing electrical apparatus is particularly suited to telephone private branch exchanges and central offices and finds extensive use in such areas. Cabinets employed in the telephone plant are designed to accommodate a plurality of sliding frameworks or racks, each of which supports a plurality of apparatus-mounting panels and associated terminal wiring. Each panel is removably secured to a rectangular framework which constitutes the structural basis of the rack, and in general, supports relays, condensers, switches, coils, and similar electrical equipment in such quantities as to constitute an item of appreciable weight. Each rack has a capacity of several panels so that the overall weight of a fully loaded rack is considerable. It has been discovered that such cabinet-housed sliding racks generate a hazardous weight unbalance when more than one of them are withdrawn from their home positions at one time. This weight unbalance results in a precarious listing of the cabinet and introduces the possibility of injury to personnel and damage to property.

It is the object of this invention to eliminate the possibility of the creation of a weight unbalance in a multi-unit apparatus-housing cabinet of the type in which the several component units are individually displaceable from home positions in the cabinet.

This object is attained in accordance with a feature of the invention by the provision, in a multirack housing cabinet, of a mechanical interlock which is common to all of the racks and is operable, incident to the withdrawal of any one of the racks from its home position, to automatically lock the remaining racks in their home positions. More particularly, each of a plurality of slidably housed apparatus-mounting racks is provided with a lock-actuating guide bar which is so positioned relative to at least one camming edge of a plurality of tandem-arrayed lock bars, slidably mounted on a lower front frame member of the cabinet that, when a rack is withdrawn from its home position, the associated guide bar engages the lock bars by way of at least one of their respective camming edges and displaces them laterally to the limit of a predetermined permissible displacement, thereby preventing further movement of the lock bars under the action of guide bars of any other of the racks. The lock bars thus act to prevent the withdrawal of more than one rack from their home positions at any one time.

Another feature of the invention resides in an interlock design which provides for the automatic release of all locked racks incident to the return of a withdrawn rack to its home position. In accordance with this feature, the withdrawal of any one rack from its home position results in a lateral displacement of the tandem-arrayed lock bars to positions which are not disturbed when the withdrawn rack is restored to its home position, and in which positions the guide bars of all other racks are operably aligned with camming edges of the lock bars so that they become immediately effective to displace the lock bars when the withdrawn rack is restored. This design feature precludes the necessity for independent means for restoring the lock bars to normal positions upon return of a rack to its home position.

A further feature of the invention contemplates an interlock arrangement comprising laterally displaceable lock bars having an overall maximum permissible displacement equal substantially to the thickness of a single actuating guide bar.

These and other features of the invention will be readily understood from the following detailed description when read with reference to the accompanying drawings in which:

Fig. 3 is a fragmentary elevation, partly in section, showing particularly the mechanism which slidably supports the racks in the cabinet;

Fig. 4 is a view of the rack-supporting mechanism taken along the line 4—4 of Fig. 3 and looking in the direction of the arrows;

Figure 5:
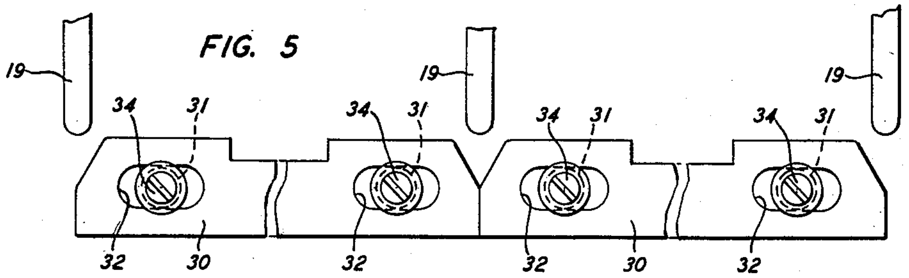
Figure 5A:
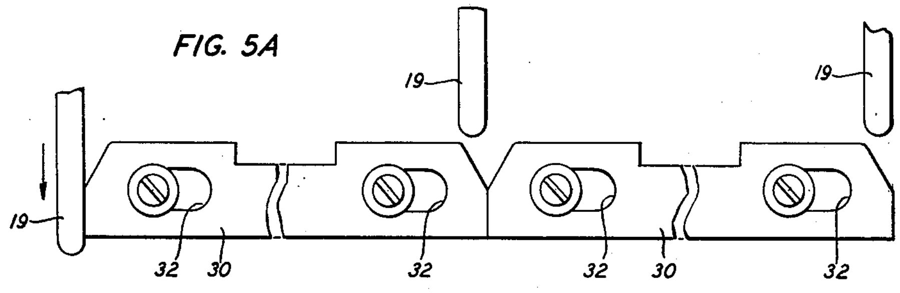
Figure 5B:
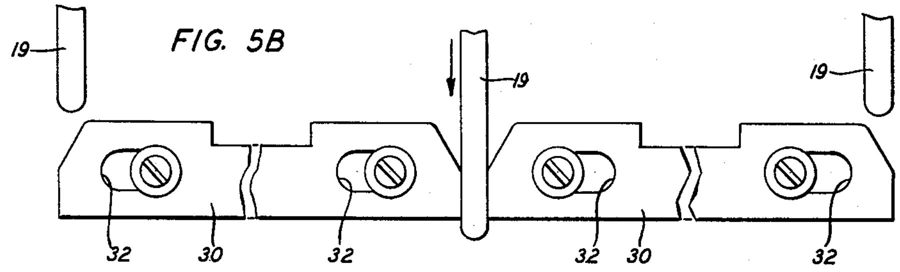
Figure 5C:
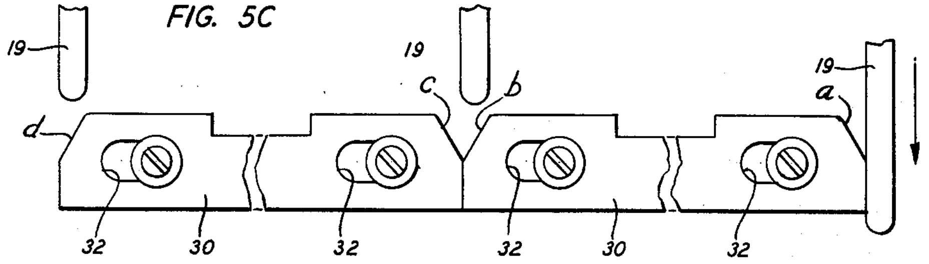

Fig. 5 is a diagrammatical representation of a pair of tandem-arrayed lock bars and of three rack-supported guide bars. In this figure the lock bars and guide bars are shown in what may be termed their home positions, that is, with the two illustrated lock bars occupying positions from which both are slidable laterally in either direction as a unit, and each in a different direction separately; and Figs. 5A, 5B and 5C illustrate, diagrammatically, the positions assumed by the lock bars with respect to the guide bars in a three-rack unit as each of the three racks is individually withdrawn from its home position.

Figures 1, 2, 2A:
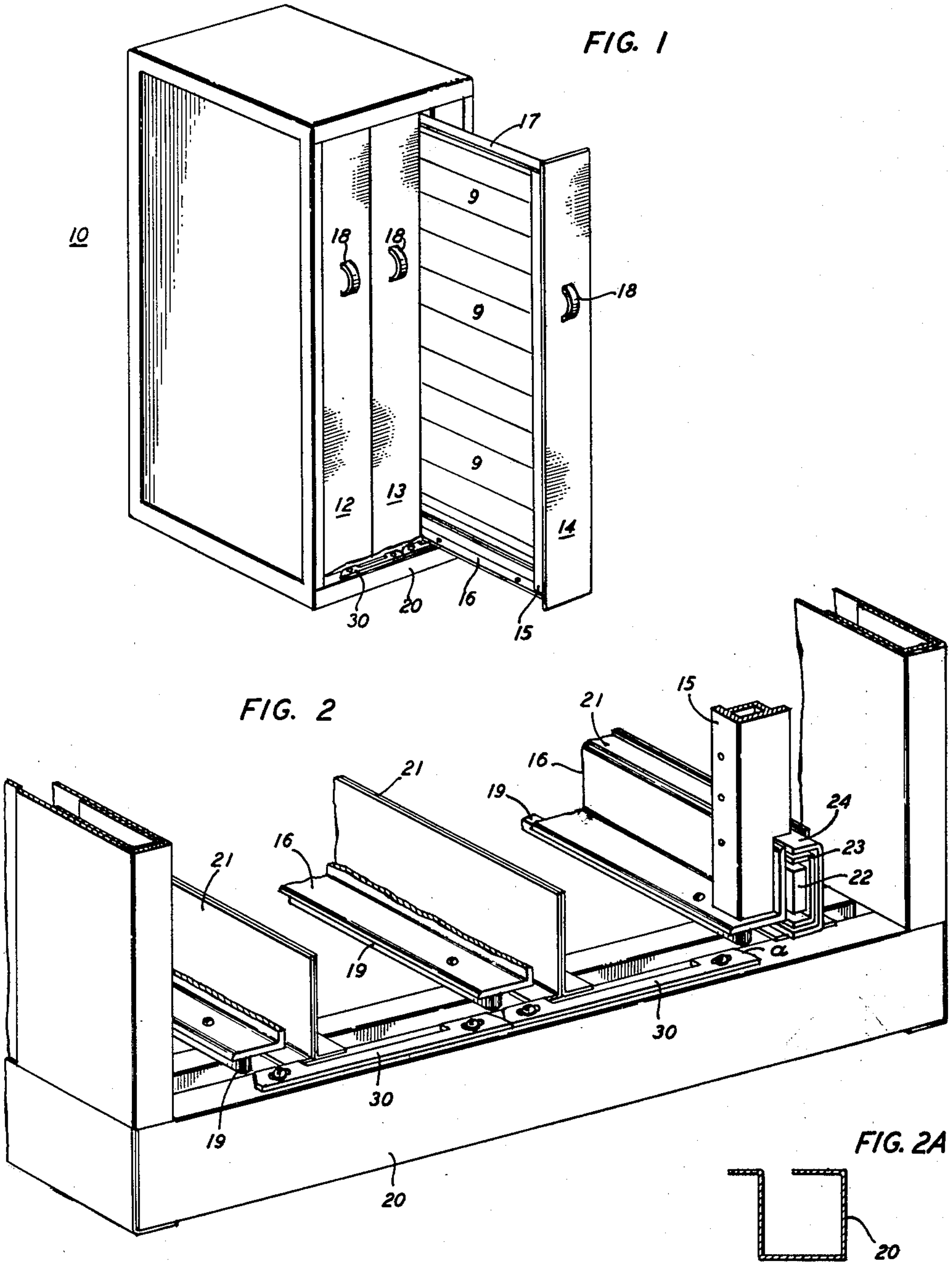
Fig. 1 is a perspective view of a private branch exchange telephone apparatus-housing cabinet having three slidable apparatus-mounting racks, one of which is shown withdrawn from its home position. A lower portion of each of the outer members, or panels of the other two racks is broken away to expose some of the elements of the mechanical interlock of this invention.
Fig. 2 is an enlarged fragmentary view of a portion of the cabinet framework; the rack supporting structure; and the cooperating lock bars and rack-mounted guide bars.
Fig. 2A is a section taken transverse of the lower forward rail of the cabinet.

The cabinet employed for exemplary purposes in this application is shown at 10 in Fig. 1, and comprises essentially an enclosure, or compartment of substantially rectangular configuration having a single open face which accommodates the front panels of the three apparatus-mounting racks 12, 13 and 14. The front panel of each rack is equipped with a handle 18 to facilitate withdrawing the rack from its home position in the cabinet. The material of which the cabinet is constructed or the structural details of its design are not critical to the present invention. Each rack comprises a substantially rectangular framework consisting of four suitably joined members, only three of which appear in the drawing and are designated by the numerals 15, 16 and 17. The vertical frame members, such as the forward member 15 and its undisclosed rear counterpart provide means for supporting a plurality of apparatus-mounting panels such as are indicated by the numerals 9. Suitable holes are provided in the vertical frame members, some of which appear in Fig. 2, for facilitating the mounting of the panels 9.

The lower horizontal frame member 16 of each rack, as shown in Fig. 2, may take the form of an L-shaped beam or angle, with the horizontal portion thereof supporting a guide bar 19. Suitable means, such as screws or screw bolts, may be employed to rigidly fix the guide bar to the undersurface of the member 16. The function of the guide bar 19 will be set forth in a later description.

The bottom front rail 20 of the cabinet 10 may be fabricated of steel and is stamped or otherwise formed to a configuration such as indicated by the section shown in Fig. 2A. The two upper flanges of the rail 20 provide a support for three equi-spaced bracket assemblies 21, each of which constitutes a support for the slide assembly shown at the right of the lower end of frame piece 15 in Fig. 2, and also in Figs. 3 and 4. The bracket assemblies 21 are supported at various intervals throughout their lengths by crosspieces (not shown) which parallel the front rail 20.

Each slide assembly comprises a center track 22, an intermediate channel 23, an outer channel 24, four steel ball retainers 25 and a plurality of steel balls 26. The outer channel 24 is fixed to the bracket assembly 21 by means of suitable studs 27, Fig. 4, while the angle piece 16 is secured to the center track 22 by means of suitable screws 28. It is understood that sufficient studs and screws 27 and 28, respectively, are provided to rigidly fix the involved members 22 and 24 of the slide assembly to the slidable rack member 16 and the fixed bracket assembly 21, respectively. In Figs. 2, 3 and 4 the elements of the slide assembly are shown in collapsed, or closed telescopic condition, that is, the condition they assume when the associated rack is in its home position. When such rack is withdrawn the various elements of the slide assembly are extended. During extension of the assembly, the outer channel 24 remains fixed, being held to the cabinet bracket assembly 21 by the studs 27; the center track 22 moves forward with the rack angle 16, being fixed thereto by screws 28, and when part way extended engages the intermediate channel 23 causing it to move forward until the various elements are fully extended. Suitable stops (not shown) are provided to effect the coaction of the three main elements of the slide assembly and to arrest the movements thereof when fully extended. The balls 26, in well-known manner, serve as rotatable bearings between the elements 22, 23 and 24. The slide assembly construction just briefly described is a well-known device for slidably associating relatively movable members and does not constitute a part of the present invention. In the instant application each rack is provided with an upper slide assembly as well as the lower one illustrated.

The interlock mechanism of the present invention includes two lock bars 30 arranged in slidable tandem array on the forward flange of the front rail 20 and are spaced therefrom by suitable spacing elements 31. Each lock bar is provided near each end thereof with an oblong hole 32, each of which accommodates a weld pin 33 which is welded to the underface of the forward flange of the front rail and is adapted to receive a screw 34. The long dimension of the oblong holes 32 determines the extent to which the lock bars 30 are free to move laterally with respect to the front rail 20. The inner corners of the two lock bars are angulated to provide camming areas. The lock bars are so positioned relative to the angle pieces 16 of the slidable racks that each of the guide bars 19 of the latter, except the guide bar of the last withdrawn rack, will always be in a position to engage at least one camming edge of the lock bars, regardless of the position of the lock bars. The guide bar of the last withdrawn and restored rack will not encounter a camming edge, as will become apparent from the following description.

The operation of the mechanical interlock will now be described and for this purpose particular reference is made to Figs. 5, 5A, 5B and 5C, with incidental reference being made to the other figures. The positions occupied by the lock bars 30 in Fig. 5 may prevail immediately after installation, and corresponds to the showing of these elements in Fig. 2. Obviously, once a rack has been withdrawn from its home position in the cabinet 10, the locations of the lock bars will be as shown in either Figs. 5A, 5B or Fig. 5C. It will be assumed that the rack designated 14 in Fig. 1 is withdrawn from the cabinet in order to expose the apparatus carried thereby for maintenance. The handle 18 is used to facilitate withdrawal and the rack 14 moves outwardly on the slide assembly which includes the elements 22, 23 and 24 and also the steel balls 26. As the rack 14 starts its forward movement, the forward end of the associated guide bar 19 engages the camming edge *a* of the right lock bar 30 causing the bar to slide laterally to the left. Depending upon whether or not the two lock bars are in contact at the time the camming edge *a* is engaged, the lock bar 30 at the left will be similarly moved to the left or the lock bar 30 at the right will move into engagement with the lock bar at the left. This latter result would ensue had the middle rack 13 been previously withdrawn from and subsequently returned to its home position, in which case the two lock bars 30 would have been separated by a distance equal to the thickness of the guide bar 19 associated with the center rack 13. In any event, the lock bars would now be located as shown in Fig. 5C. It will be observed that, in this arrangement, the lock bars have been moved to the left to the limit of their possible displacement in that direction. It will be observed further, that any attempt to withdraw either of the racks 12 or 13 from their home positions at this time will be unsuccessful since the lock bars are already in their extreme left positions and the guide bar 19 of the withdrawn rack 14 acts to prevent any movement of the lock bars to the right. Therefore, should an attempt be made to withdraw either of the racks 12 or 13 from their home positions, their associated guide bars 19 would encounter immovable lock bars thus preventing withdrawal of such racks. The racks 12 and 13 are thus effectively locked in their home positions.

It will be noted also, that with the lock bars 30 in the positions shown in Fig. 5C, the guide bars 19 of racks 12 and 13 are still in operative alignment with camming edges *b* and *d* of lock bars 30 so that, when the guide bar 19 associated with the rack 14 assumes its normal position, incident to the return of the rack to its home position, the two lock bars are immediatly released for operation laterally to the right under the action of either of the guide bars associated with racks 12 or 13. In the event rack 13 is next withdrawn from its home position after the return of rack 14, the guide bar 19 associated therewith functions to move the right lock bar 30 to the right and to locate itself between the two bars as shown in Fig. 5B. It is apparent that, as now arranged, the guide bar 19 of rack 13 prevents any lateral displacement of the lock bars under the action of the guide bar of either rack 12 or rack 14. These two racks, therefore, are effectively locked in their home positions. Upon return of rack 13 to its home position and the consequent removal of the associated guide bar 19 from its position between the two lock bars, the latter immediately becomes free for actuation by the guide bar of either rack 12 or rack 14.

If rack 12 is now withdrawn from its home position, the condition which prevails is as illustrated in Fig. 5A. In each of the conditions shown in Figs. 5A, 5B and 5C, it will be observed that the guide bars of the racks which are locked in their home positions are always in operative alignment with camming edges of the lock bars 30. This design feature precludes the necessity for providing means for restoring the lock bars to some predetermined normal position, such as pictured in Fig. 5, in order to correctly position them for operation by the guide bars 19.

The total permissible distance of travel of the lock bars corresponds to the width of any one guide bar. The oblong holes 32 in the lock bars are dimensioned accordingly.

The three-rack cabinet shown in Fig. 1 has been chosen for exemplary purposes only, it being apparent that the invention is applicable to any multirack design.

What is claimed is:

1. In combination, a cabinet comprising a plurality of adjacently disposed apparatus units, means mounting each of said apparatus units for individual slidable movement out of and into a home position in said cabinet, and means for preventing the withdrawal of more than one of said apparatus units from their home positions at one time, comprising a plurality of lock bars mounted on said cabinet in tandem array, means mounting said lock bars on said cabinet for limited slidable movement only in a direction at right angles to the direction of movement of said units, each of said lock bars having integrally formed camming surfaces, a guide bar individual to and rigidly fixed to each of said apparatus units and normally disposed with respect to a camming surface of at least one of said lock bars as to coact therewith to laterally displace the corresponding lock bars when a corresponding apparatus unit is withdrawn from its home position and to interpose itself between a pair of adjacent lock bars whereby the said guide bar of a withdrawn unit functions to prevent lateral displacement of the lock bars by the guide bars of the other of said units and thereby to effectively lock said other units in their home positions in said cabinet.

2. The combination according to claim 1 in which the guide bars of the locked apparatus units are in operative alignment with camming surfaces of said lock bars after said lock bars are laterally displaced by the withdrawal of one of said apparatus units from its home position.

3. The combination according to claim 1 in which said mounting means includes fixed stop members which cooperate with elongated apertures in said lock bars to limit the cumulative lateral displacement of said lock bars to a distance equal to the width of one of said guide bars.

4. The combination according to claim 1, in which the limited movement afforded said lock bars by said mounting means and the width of said guide bars are such as to insure alignment of the guide bars of the other of said apparatus mounting units with camming surfaces of said lock bars when the withdrawn unit is restored to its home position in said cabinet.

5. In a cabinet, apparatus mounting units arranged side by side for slidable movement into and out of home positions in said cabinet, a plurality of tandem arrayed lock bars disposed on said cabinet for endwise slidable movement in directions transverse to the direction of movement of said apparatus units and having elongated apertures therein, each of said lock bars having a camming edge on each end thereof, means comprising stop members fixed to said cabinet and cooperating with the apertures in said lock bars to limit the endwise movement of said lock bars to a predetermined maximum distance, and a guide bar carried by each of said apparatus mounting units adapted to engage the camming edge of at least one of said lock bars to effectively displace the corresponding lock bars laterally and interpose itself between a pair of adjacent lock bars when the associated apparatus mounting unit is moved out of its home position in the cabinet, said guide bar being of a width equal to the said predetermined maximum endwise movement of said lock bars whereby, when interposed between said pair of adjacent lock bars, the guide bar of the withdrawn apparatus mounting unit prevents endwise movement of the lock bars by the guide bars of any of the other of said apparatus mounting units.

References Cited in the file of this patent

UNITED STATES PATENTS

| | | |
|---|---|---|
| 1,843,784 | Rix | Feb. 2, 1932 |
| 2,240,067 | Bolesky et al. | Apr. 29, 1941 |
| 2,564,039 | Thomas | Aug. 14, 1951 |